(12) United States Patent
Lubin et al.

(10) Patent No.: US 7,756,288 B2
(45) Date of Patent: Jul. 13, 2010

(54) METHOD AND APPARATUS FOR ANALOG INSERTION OF LOW FREQUENCY WATERMARKS

(76) Inventors: Jeffrey Lubin, 3 Wallingford Dr., Princeton, NJ (US) 08540; Christos Alkivladis Polyzois, 16 Feller Ct., Lawrenceville, NJ (US) 08540

( * ) Notice: Subject to any disclaimer, the term of this patent is extended or adjusted under 35 U.S.C. 154(b) by 1381 days.

(21) Appl. No.: 10/856,022

(22) Filed: May 28, 2004

(65) Prior Publication Data

US 2004/0240705 A1 Dec. 2, 2004

Related U.S. Application Data

(60) Provisional application No. 60/474,900, filed on May 29, 2003.

(51) Int. Cl.
*G06K 9/00* (2006.01)
(52) U.S. Cl. .................................. 382/100; 382/218
(58) Field of Classification Search ................ 382/100, 382/218; 352/40; 356/425; 348/744
See application file for complete search history.

(56) References Cited

U.S. PATENT DOCUMENTS

| | | |
|---|---|---|
| 5,134,496 A | 7/1992 | Schwab et al. |
| 5,319,453 A | 6/1994 | Copriviza et al. |
| 5,365,552 A | 11/1994 | Astle |
| 5,396,531 A | 3/1995 | Hartley |
| 5,404,160 A | 4/1995 | Schober et al. |
| 5,488,570 A | 1/1996 | Agarwal |
| 5,502,494 A | 3/1996 | Auld |
| 5,515,296 A | 5/1996 | Agarwal |
| 5,519,780 A | 5/1996 | Woo et al. |
| 5,530,759 A | 6/1996 | Braudaway et al. |
| 5,568,570 A | 10/1996 | Rabbani |
| 5,636,292 A | 6/1997 | Rhoads |
| 5,646,997 A | 7/1997 | Barton |
| 5,659,726 A | 8/1997 | Sandford et al. |
| 5,661,574 A | 8/1997 | Kawana |
| 5,664,018 A | 9/1997 | Leighton |
| 5,686,965 A | 11/1997 | Auld |
| 5,696,848 A | 12/1997 | Patti et al. |
| 5,703,793 A | 12/1997 | Wise et al. |
| 5,778,102 A | 7/1998 | Sandford et al. |
| 5,809,139 A | 9/1998 | Girod et al. |
| 5,825,892 A | 10/1998 | Braudaway et al. |
| 5,841,886 A | 11/1998 | Rhoads |
| 5,848,155 A | 12/1998 | Cox |

(Continued)

FOREIGN PATENT DOCUMENTS

JP 2002359845 A 12/2002

OTHER PUBLICATIONS

Hartung and Kutter; Multimedia Watermarking Techniques; Proc. IEEE; 87(7), pp. 1079-1107 (1999).

(Continued)

*Primary Examiner*—Vu Le
*Assistant Examiner*—Claire Wang
(74) *Attorney, Agent, or Firm*—McDonnell Boehnen Hulbert & Berghoff LLP

(57) ABSTRACT

A method and apparatus for inserting a watermark onto an illuminated image sequence. A light modulator modulates a light source. A controller controls the light modulator such that a low frequency watermark is inserted onto the illuminated image sequence.

53 Claims, 6 Drawing Sheets

U.S. PATENT DOCUMENTS

| | | | |
|---|---|---|---|
| 5,850,481 A | 12/1998 | Rhoads | |
| 5,862,260 A | 1/1999 | Rhoads | |
| 5,881,176 A | 3/1999 | Keith et al. | |
| 5,901,178 A | 5/1999 | Lee et al. | |
| 5,905,819 A | 5/1999 | Daly | |
| 5,907,619 A | 5/1999 | Davis | |
| 5,915,027 A | 6/1999 | Cox et al. | |
| 5,930,369 A | 7/1999 | Cox et al. | |
| 5,933,798 A | 8/1999 | Linnartz | |
| 5,959,717 A * | 9/1999 | Chaum | 352/40 |
| 5,991,426 A | 11/1999 | Cox et al. | |
| 6,018,374 A * | 1/2000 | Wrobleski | 348/744 |
| 6,026,193 A | 2/2000 | Rhoads | |
| 6,037,984 A | 3/2000 | Isnardi et al. | |
| 6,044,156 A | 3/2000 | Honsinger et al. | |
| 6,094,722 A | 7/2000 | Astola et al. | |
| 6,101,602 A | 8/2000 | Fridrich | |
| 6,104,826 A | 8/2000 | Nakagawa et al. | |
| 6,130,741 A | 10/2000 | Wen et al. | |
| 6,137,904 A | 10/2000 | Lubin et al. | |
| 6,188,728 B1 | 2/2001 | Hurst | |
| 6,208,735 B1 | 3/2001 | Cox et al. | |
| 6,208,745 B1 | 3/2001 | Florencio et al. | |
| 6,208,746 B1 | 3/2001 | Musgrave | |
| 6,211,919 B1 | 4/2001 | Zink et al. | |
| 6,224,874 B1 | 5/2001 | Ehret et al. | |
| 6,373,960 B1 | 4/2002 | Conover et al. | |
| 6,381,367 B1 | 4/2002 | Ryan | |
| 6,449,379 B1 | 9/2002 | Rhoads | |
| 6,535,617 B1 | 3/2003 | Hannigan et al. | |
| 6,553,127 B1 | 4/2003 | Kurowski | |
| 6,563,936 B2 | 5/2003 | Brill et al. | |
| 6,577,744 B1 | 6/2003 | Braudaway et al. | |
| 6,594,373 B1 | 7/2003 | Gustafson | |
| 6,611,608 B1 | 8/2003 | Wu et al. | |
| 6,624,874 B2 | 9/2003 | Revelli, Jr. et al. | |
| 6,636,638 B1 | 10/2003 | Yamaguchi | |
| 6,665,418 B1 | 12/2003 | Honsinger | |
| 6,674,873 B1 | 1/2004 | Donescu et al. | |
| 6,678,389 B1 | 1/2004 | Sun et al. | |
| 6,683,966 B1 | 1/2004 | Tian et al. | |
| 6,687,384 B1 | 2/2004 | Isnardi | |
| 6,718,045 B2 | 4/2004 | Donescu et al. | |
| 6,721,437 B1 | 4/2004 | Ezaki et al. | |
| 6,757,407 B2 | 6/2004 | Bruckstein et al. | |
| 6,760,464 B2 | 7/2004 | Brunk | |
| 6,763,121 B1 | 7/2004 | Shaked et al. | |
| 6,771,795 B1 | 8/2004 | Isnardi | |
| 6,778,678 B1 | 8/2004 | Podilchuk et al. | |
| 6,785,401 B2 | 8/2004 | Walker et al. | |
| 6,792,129 B1 | 9/2004 | Zeng et al. | |
| 6,792,130 B1 | 9/2004 | Jones et al. | |
| 6,885,757 B2 | 4/2005 | Bloom et al. | |
| 6,944,313 B1 | 9/2005 | Donescu | |
| 7,043,019 B2 * | 5/2006 | Tehranchi et al. | 380/218 |
| 7,058,199 B1 | 6/2006 | Au et al. | |
| 7,113,615 B2 | 9/2006 | Rhoads et al. | |
| 7,218,754 B2 * | 5/2007 | Schumann et al. | 382/100 |
| 7,295,681 B2 | 11/2007 | Lubin et al. | |
| 7,298,865 B2 | 11/2007 | Lubin et al. | |
| 2002/0076083 A1 | 6/2002 | Levy | |
| 2002/0090110 A1 | 7/2002 | Braudaway et al. | |
| 2002/0141584 A1 | 10/2002 | Razdan et al. | |
| 2002/0168069 A1 | 11/2002 | Tehranchi et al. | |
| 2002/0168082 A1 | 11/2002 | Razdan | |
| 2002/0180973 A1 * | 12/2002 | MacKinnon et al. | 356/425 |
| 2003/0021439 A1 | 1/2003 | Lubin et al. | |
| 2003/0033347 A1 | 2/2003 | Bolle et al. | |
| 2003/0063361 A1 | 4/2003 | Ohnishi et al. | |
| 2003/0112974 A1 | 6/2003 | Levy | |
| 2003/0188166 A1 | 10/2003 | Pelly et al. | |
| 2004/0009763 A1 | 1/2004 | Stone et al. | |
| 2004/0013284 A1 | 1/2004 | Yu | |
| 2004/0064702 A1 | 4/2004 | Yu et al. | |
| 2004/0066951 A1 | 4/2004 | Pelly et al. | |
| 2004/0120523 A1 * | 6/2004 | Haitsma et al. | 380/239 |
| 2005/0018875 A1 | 1/2005 | Lubin et al. | |
| 2005/0025336 A1 | 2/2005 | Lubin et al. | |
| 2005/0036174 A1 | 2/2005 | Lubin | |
| 2005/0175216 A1 | 8/2005 | Bloom et al. | |
| 2008/0212824 A1 * | 9/2008 | Braudaway et al. | 382/100 |

OTHER PUBLICATIONS

Wolfgang et al.; Perceptual Watermarks for Digital Images and Video; Proc. IEEE, 87(7), pp. 1108-1126 (1999).

J. Lubin et al.; Robust, Content-Dependent, High-Fidelity Watermark For Tracking In Digital Cinema, in *Security and Watermarking of Multimedia Contents V*; Proc. SPIE, vol. 5020, Jan. 24, 2003.

Baharav et al. "Watermarking of Dither Halftone Images" IS&T/SPIE Conference on Security and Watermarking of Multimedia Contents, Jan. 1999, SPIE vol. 3657, pp. 307-316.

Cox et al., "A Secure, Imperceptable yet Perceptually Salient, Spread Spectrum Watermark for Multimedia", SouthCon96, Conference Record, Orlando, FL, Jun. 25-27, 1996, pp. 192-197.

Gonzalez et al., "Digital Image Processing", 2nd Edition, Prentice-Hall, 2002, pp. 42-45.

Kelly, "Visual Processing of Moving Stimuli", J. Opt. Soc. Am. A., vol. 2., No. 2, Feb. 1984, pp. 216-225.

Kelly, "Motion and vision. II. Stabilized spatio-temporal threshold surface", J. Opt. Soc. Am., vol. 69, No. 10, Oct. 1979, pp. 1340-1349.

Lacy et al., "Intellectual Property Protection Systems and Digital Watermarking", Optics Express, vol. 3, No. 12, Dec. 7, 1998, pp. 478-484.

Lu et al., "Highly Robust Image Watermarking Using Complementary Modulations", Information Security International Workshop, 1749, 1999, pp. 136-153.

Lubin et al. "Robust, Content Dependent, High-Fidelity Watermarking for Tracking in Digital Cinema" SPIE vol. 5020 (Jan. 2003), pp. 536-545.

Nguyen et al. "Registration Methods for Non-Blind Watermark Detection in Digital Cinema Applications", SPIE vol. 5020 (Jan. 2003), pp. 553-562.

Podilchuk et al., "Image Adaptive Watermarking Using Visual Models", Communications 16(4), May 1998, pp. 525-539.

Swanson et al., "Multiresolution Scene-Based Video Watermarking Using Perceptual Models", IEEE J. Selected Areas in Communications, 16(4), May 1998, pp. 540-550.

Wang et al., "Identify Regions of Interest (ROI) for video watermarking embedment with Principle Component Analysis", Proceedings ACM Multimedia 2000 Workshops, Marina del Ray, CA Nov. 4, 2000, pp. 459-461.

Wei et al, "Perceptual Digital Watermark of Images Using Wavelet Transform", IEEE Transactions on Consumer Electronics, 44(4), Nov. 1998, pp. 1267-1272.

International Search Report for PCT Pat. App. No. PCT/US04/17355 mailed on Feb. 11, 2005.

Written Opinion of International Search Authority for PCT Pat. App. No. PCT/US04/17355 mailed on Feb. 11, 2005.

* cited by examiner

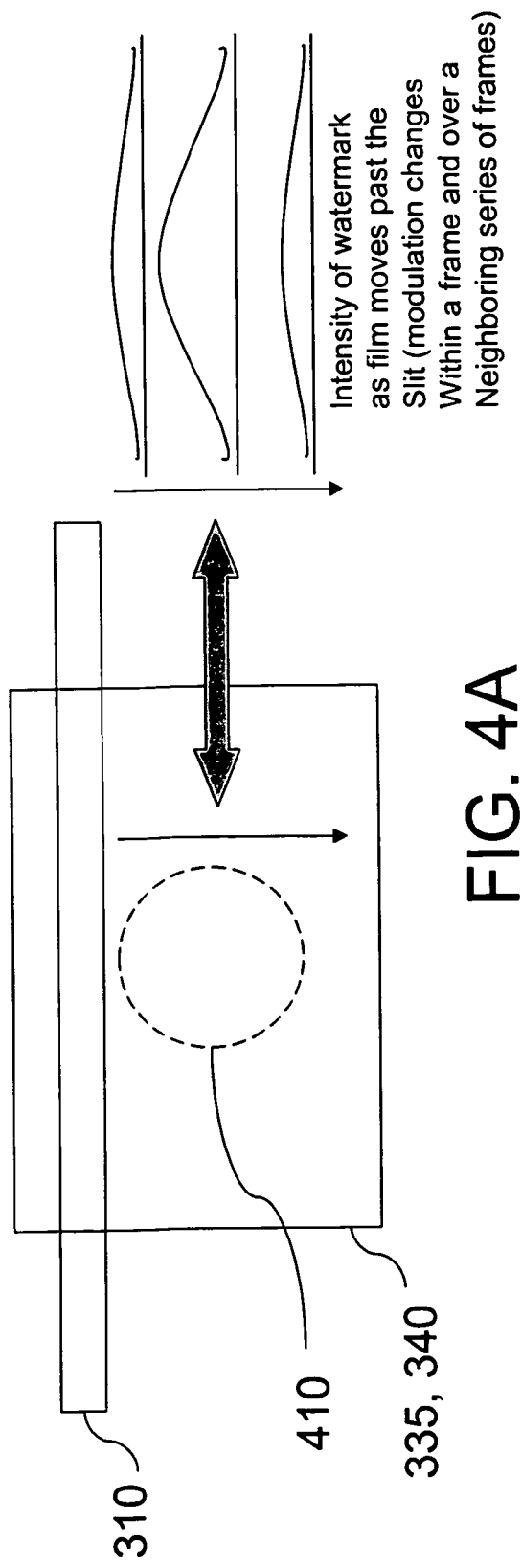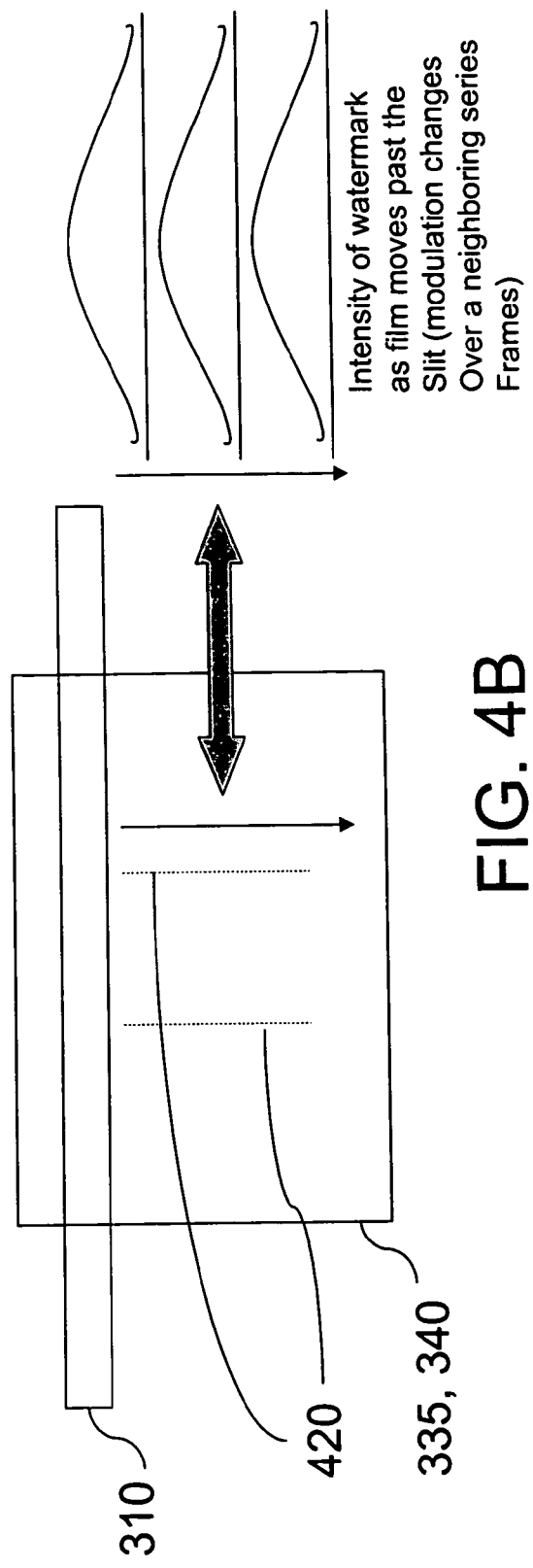

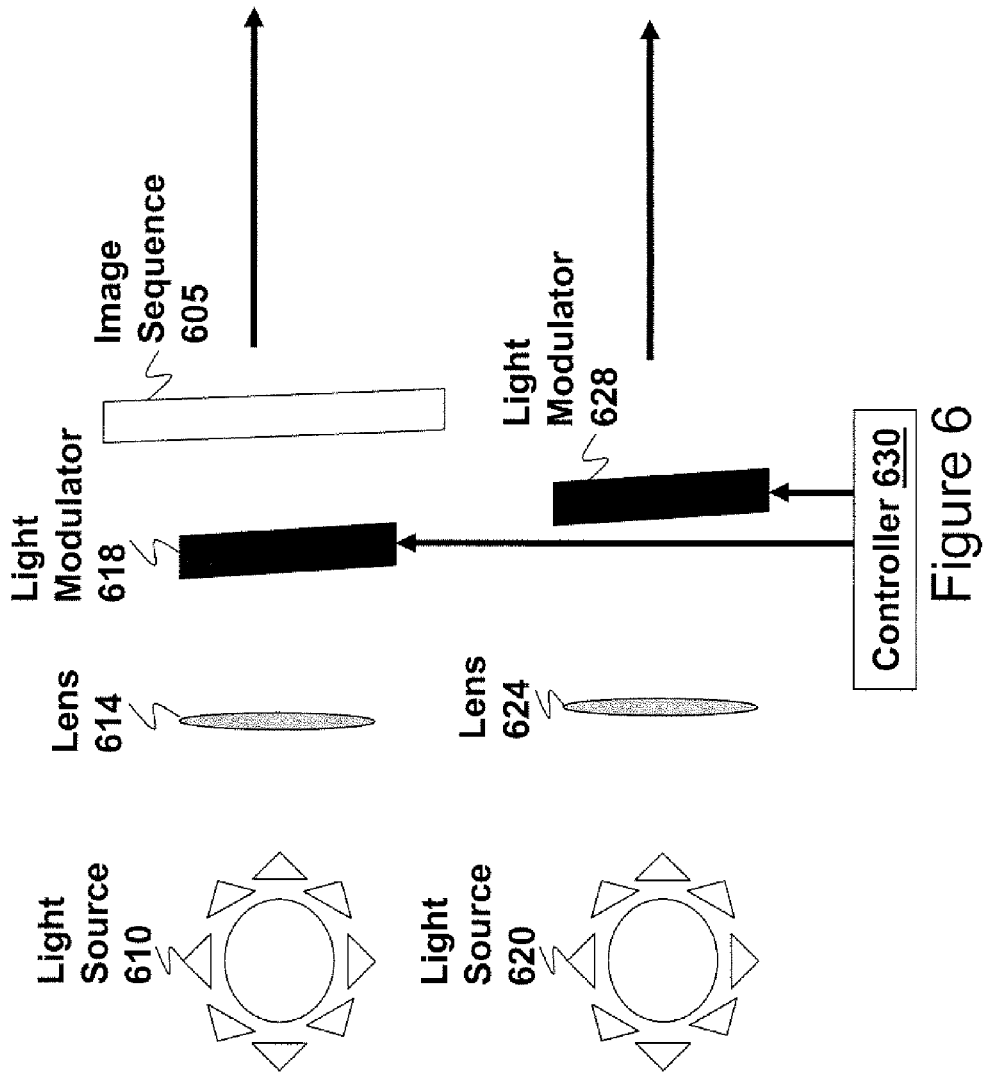

METHOD AND APPARATUS FOR ANALOG INSERTION OF LOW FREQUENCY WATERMARKS

CROSS-REFERENCE TO RELATED APPLICATIONS

This application claims benefit of U.S. provisional patent application Ser. No. 60/474,900, filed May 29, 2003, which is herein incorporated by reference.

BACKGROUND OF THE INVENTION

1. Field of the Invention

Embodiments of the present invention generally relate to insertion techniques for watermarks. More particularly, the present invention relates to insertion techniques for low frequency watermarks.

2. Description of the Related Art

Watermarking is a technique that can be used to detect the origin of a copy of audio and/or visual media. This technique is especially beneficial in the motion picture industry. Typically, when a motion picture is released, there is a very large market for unauthorized copies of the motion picture. Watermarking facilitates the detection of the origin of any unauthorized copies. Watermarking information is very critical in eliminating, or at least minimizing, piracy of copyrighted audio/visual content.

Given these potential leaks, a content owner needs forensic tools that enable the tracking of unauthorized copies back to the party who licensed the use of the content, and who was responsible for preventing its further distribution. The ability of the content owners to identify the exact distribution point at which material was stolen can be used as a tool to identify the responsible parties and can act as a deterrent to such theft. A watermark uniquely identifying the licensee of that copy of the content can serve this purpose. This tracking watermark will give content owners a powerful forensic tool against piracy, because it allows them to trace pirated copies to the individual customers (e.g., for video download), or to a specific post-production house, or to the time and location (e.g., for digital cinema) at which theft occurred.

Most watermarking methods use high frequency techniques to insert watermarks into audio/visual content. However, there are problems associated with high frequency watermarking techniques. High frequencies should be avoided because the reduced sensitivity of the Human Visual System (HVS) at high frequencies allows these components to be distorted by processing or attacked by adversaries without significant degradation to the fidelity of the content. Thus, watermark data in these components can be damaged. One might conclude that since there is also reduced HVS sensitivity at low frequencies that low frequencies should be avoided for the same reason. However, the high degree of information in the low frequency components makes them difficult to distort without degrading the fidelity of the content. Most optical and computational processes that are applied to moving imagery and result in "matchable" quality tend to reproduce these low frequency/high information components with high fidelity. For example, camcorder piracy, which often degrades middle and high frequencies to the extent that typical spread-spectrum watermarks are significantly damaged, still generally produces a video stream from which a viewer could describe in detail what is happening in each scene.

Therefore, there is a need in the art for a method and apparatus to provide low frequency watermarking of content.

SUMMARY OF THE INVENTION

In one embodiment, the present invention generally relates to a method and apparatus for inserting a watermark onto an illuminated image sequence. A light modulator modulates a light source. A controller controls the light modulator such that a low frequency watermark is inserted onto the illuminated image sequence. In one embodiment a serial and/or parallel configuration may be used in order to insert the low frequency watermark onto the illuminated image sequence. In another embodiment a slit modulator may be used to facilitate high speed film printing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4A illustrates watermark insertion using the apparatus disclosed in FIG. 3 according to one embodiment of the invention;

FIG. 4B illustrates watermark insertion using the apparatus disclosed in FIG. 3 according one embodiment of the invention.

FIG. 6 illustrates an apparatus for inserting a watermark.

DETAILED DESCRIPTION

The present invention discloses insertion techniques for low frequency watermarks. For some watermarking applications, e.g., per-show fingerprinting of film-based cinema presentation, it is desirable to insert the watermark into an analog signal stream. For low frequency watermarks, this analog insertion can be done in an especially cost-effective manner, since its inherent low frequency nature allows the use of relatively low performance light modulating hardware (e.g., a low resolution liquid crystal light valve panel). Insertion techniques may be used for both printing and projecting stages. It is useful to mark at both these stages, since the film copy can be marked at the printing stage, while time of showing and other temporally dynamic information can be marked at projection time.

For low spatiotemporal frequency watermarking purposes, a low spatiotemporal resolution light modulator is placed in series and/or parallel with a film printer or projector. It modulates the light source that would otherwise evenly illuminate each frame of the film, thus causing a subtle low frequency modulation in the printed or projected film content. The light modulator is controlled by a device that has been programmed in a previous profiling stage to determine appropriate modulations, with an optional sync signal from the projector or printer to help maintain temporal registration. For slit-based high speed film printing, a slit modulator may be used.

Figure 1:
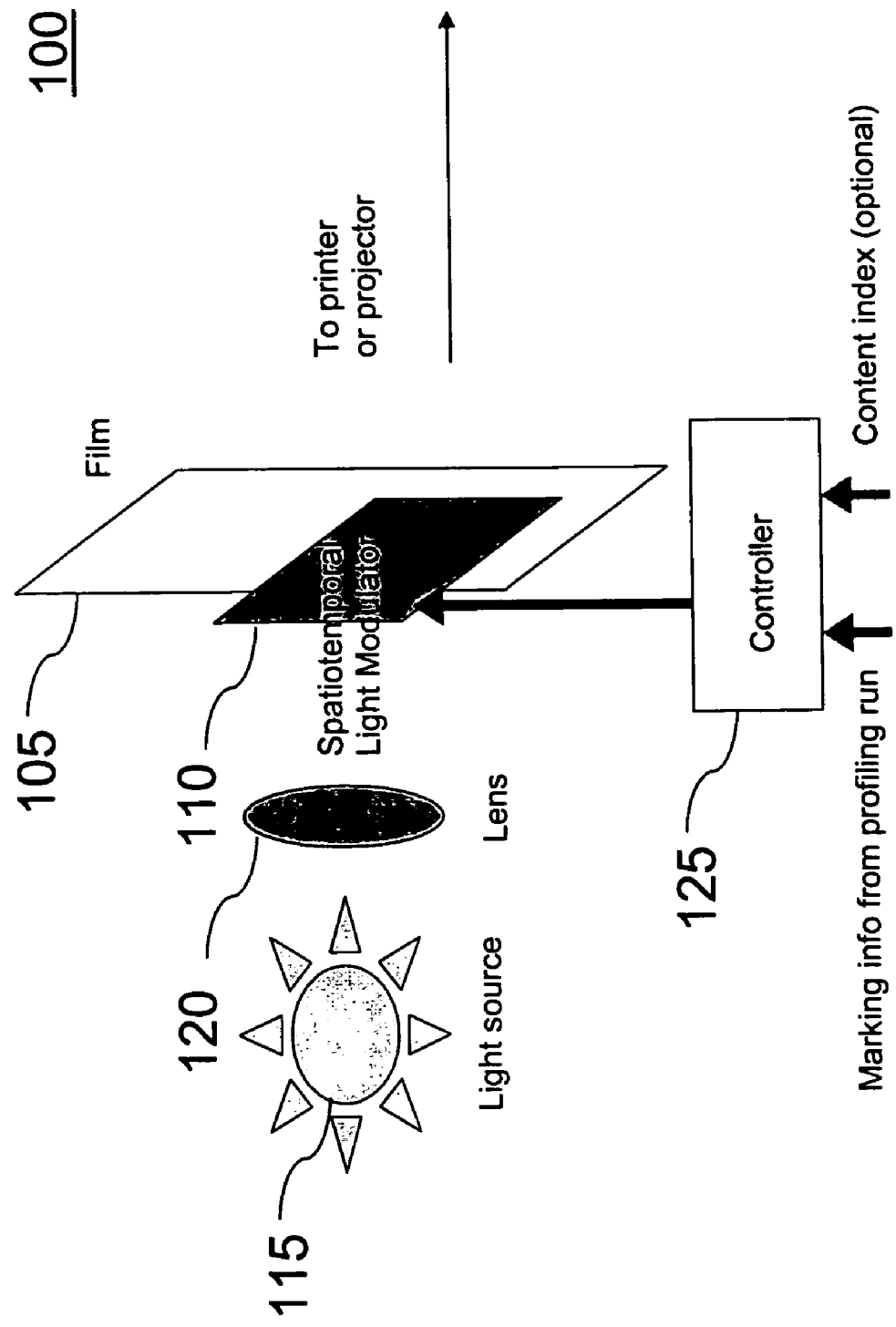
FIG. 1 illustrates a serial implementation of a watermarking apparatus according to one embodiment of the present invention.
Figure 2:
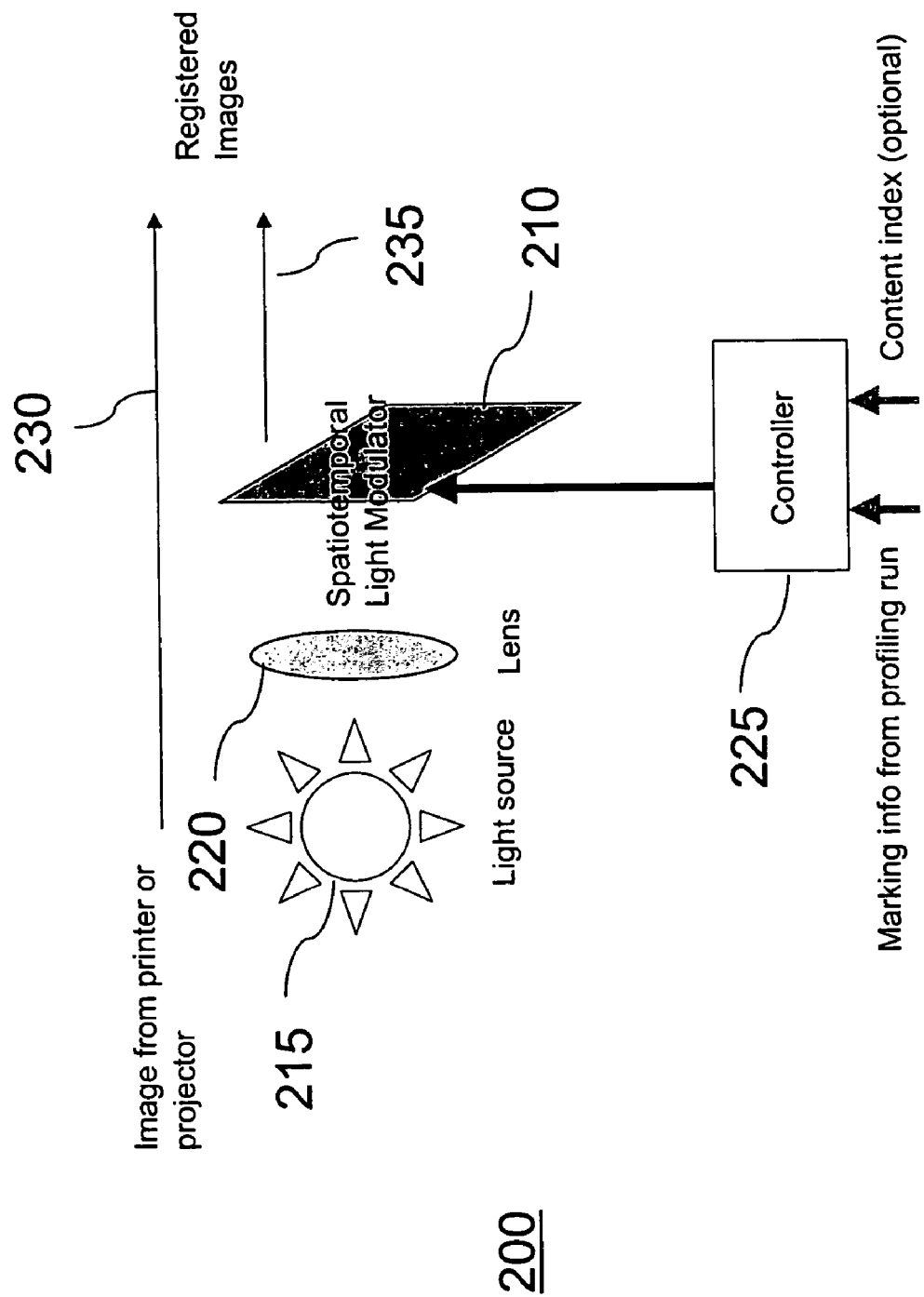
FIG. 2 illustrates a parallel implementation of a watermarking apparatus according to one embodiment of the present invention.

FIGS. 1 and 2 illustrate two embodiments of the invention, serial 100 and parallel 200. As in most projection and transparency-based printing operations, light from a lamp source 115, 215 is modified by a lens to maintain even distribution across the film plane. A light modulator 110, 210 modulates light from light source 115, 215. Light modulator 110, 210 may be a spatio-temporal light modulator. In one embodiment light modulator 110, 210 may be a liquid crystal light valve.

FIG. 1 illustrates a serial embodiment of the present invention. A uniform plane of light is intercepted near the film plane 105 (e.g., just before or just after passing through the film 105), by a spatiotemporal light modulator 110 (e.g., liquid crystal light valve) that is controlled by a controller 125 to selectively increase and/or decrease its light transmissivity over space and time, to provide the slight, low frequency perturbations in luminance needed for watermarking. Note also that for low-frequency marking, the light modulator 110 can be placed at some distance from the film plane, since the resulting blur of the modulator's image upon the film may be desired.

If both positive and negative excursions of the low frequency watermark are desired, the "resting" transmissivity of the light modulator 110 must be below 100%, with a consequent decrease in total light throughput that can be compensated by the use of a slightly brighter bulb in light source 115. Alternatively, for some watermarks, positive excursions can be excluded.

FIG. 2 illustrates a parallel embodiment 200 where a low resolution modulated image sequence of the watermark can be maintained alongside the main film image sequence, with light from two paths 230, 235 converging on the projector screen or surface to be printed (not shown). In this embodiment, light from the illuminated image sequence comprises one path of light 230 and light from light modulator 210 comprises another path of light 235. Note that the convergence need not happen outside the projector; that is, the two signals can be mixed optically inside the projector or printer for added security and repeatability. The parallel apparatus 200 can create positive luminance excursion watermarks without any loss of overall contrast. The parallel embodiment 200 can be used to create positive luminance excursion watermarks instead of the serial embodiment 100.

The serial 100 and parallel 200 embodiments can also be used together, with negative-going marks handled by the serial branch and positive-going marks handled by the parallel branch. This dual approach allows for enabling both signs (positive/negative) of a watermark without any loss in overall contrast.

FIG. 6 illustrates an apparatus for inserting a watermark. The apparatus comprises a first light source 610 for illuminating an image sequence 605, a first lens 614 for modifying the light from the first light source 610, a first light modulator 618 for modulating the modified light from the first light source 610, a second light source 620, a second lens 624 for modifying the light from the second light source 620, a second light modulator 628 for modulating the modified light from the second light source 620; and a controller 630 for controlling the first light modulator 618 and the second light modulator 618 such that a low frequency watermark is inserted onto the illuminated image sequence.

Figure 3:
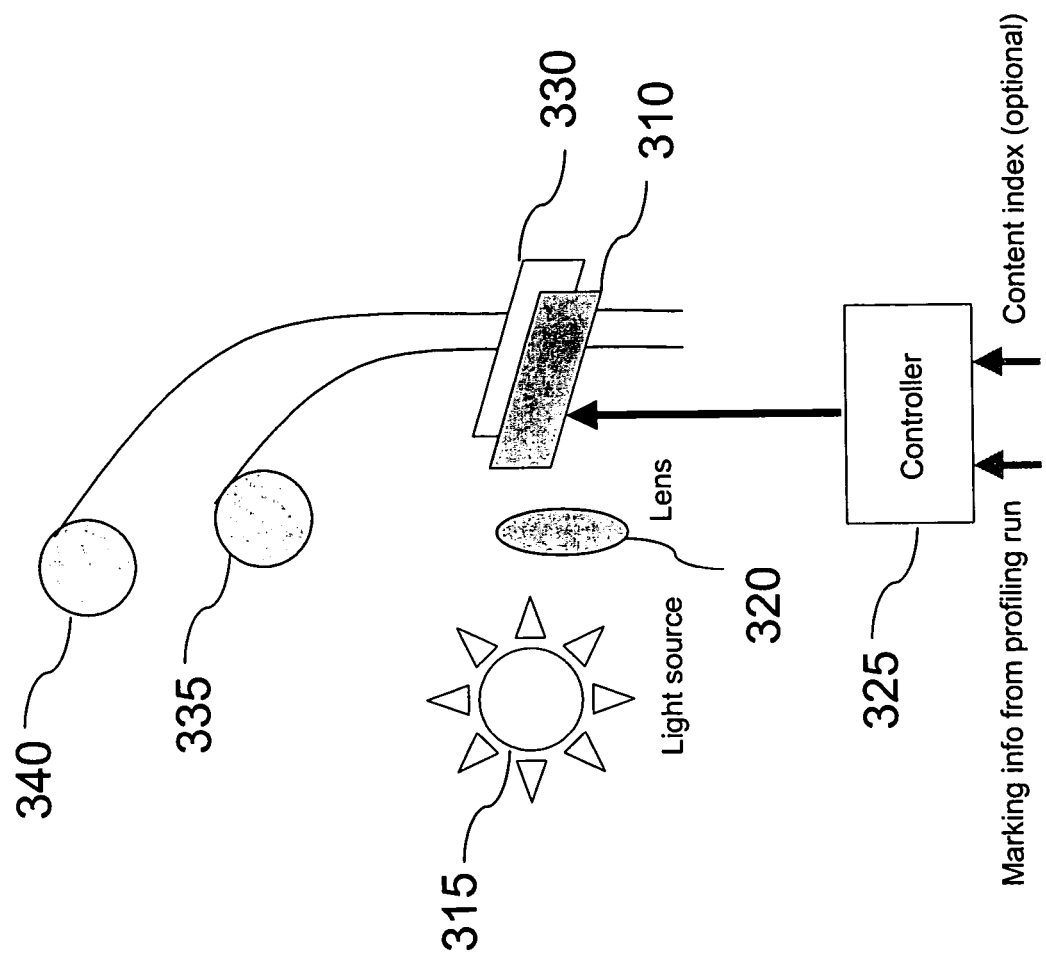
FIG. 3 illustrates the present invention adapted for high speed film printing applications according to one embodiment of the present invention.

FIG. 3 illustrates an embodiment of the present invention adapted for high speed film printing applications (e.g., release print generation) which are typically performed with an illuminated slit 330 and no shutter. There is a master film 335 and a film to be printed 340. Here, the slit-based light modulator 310 operates only over the slit region 330, and modifies transmissivity appropriately for each spatial location in each frame by taking into account the speed at which the film traverses the slit 330. Light from light source 315 is passed through lens 320. Light modulator 310 adds the watermark as each frame of master film 335 and film to be printed 340 passes slit region 330.

For slit-based operation, a feedback-based frame index signal received at controller 325 is useful for maintaining registration. For example, a sensor near the slit could keep approximate track of the start and end of each frame going by, thus enabling more accurate modification of transmissivity for the intended watermark.

FIG. 4A illustrates one embodiment of how a watermark is inserted onto an illuminated image sequence using slit-based film printing methods shown in FIG. 3. As film 335, 340 moves past slit 330, a low frequency watermark 410 is inserted by light modulator 310 onto the film. The intensity of the watermark rises slowly reaching a peak then decreases slowly as film 335, 340 moves past slit 330.

FIG. 4B illustrates another embodiment of how a watermark is inserted onto an illuminated image sequence using slit-based film printing methods shown in FIG. 3. In this embodiment, light modulator 310 modulates at a speed slower than the frame rate of film 335, 340. As film 335, 340 moves past slit 330, a low frequency watermark 420 is inserted by light modulator 310 over multiple frames of film. The intensity of the watermark 420 rises slowly reaching a peak then decreases slowly as multiple frames of film 335, 340 move past slit 330. In this instance watermark 420 will resemble a blurry bar that gradually fades in and out over the course of many frames. This embodiment allows the watermarking to be done in a more cost efficient manner.

Figure 5:
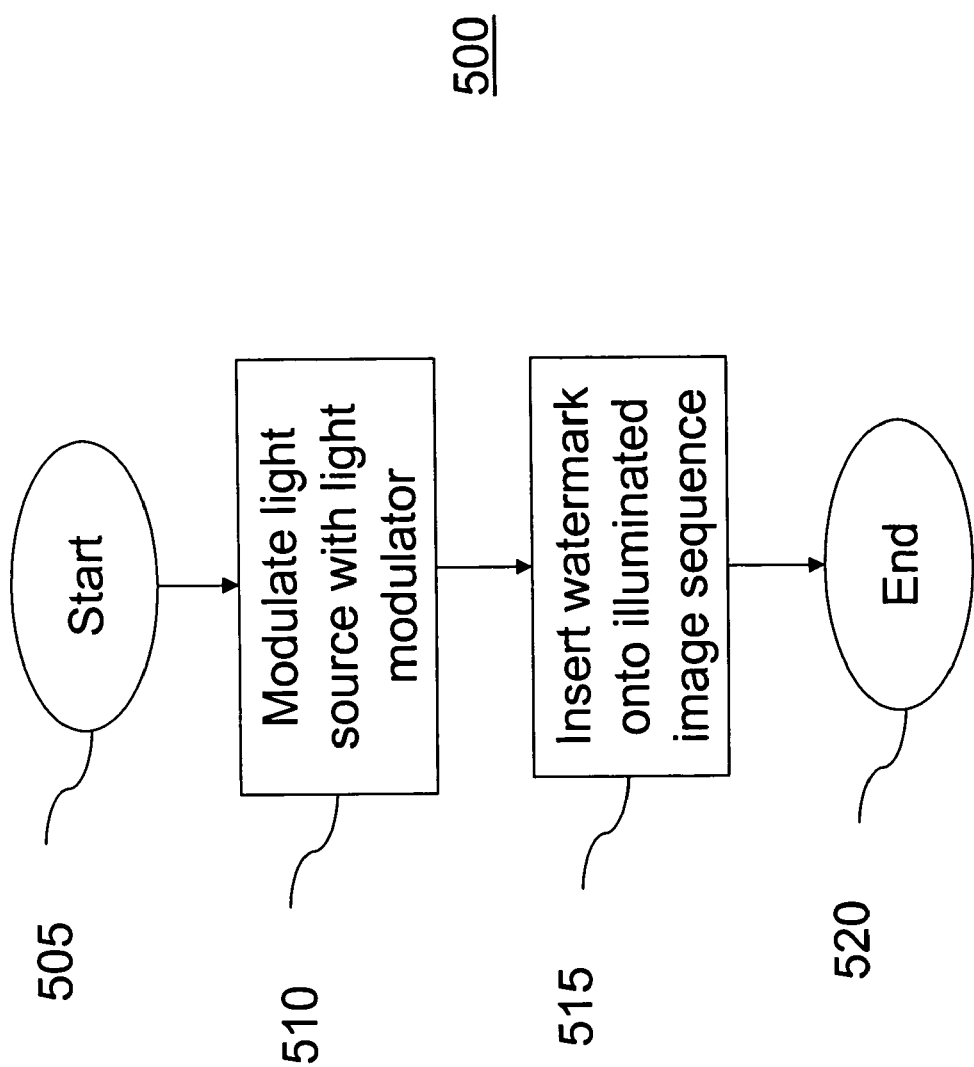
FIG. 5 illustrates a diagram in accordance with a method according to one embodiment of the invention.

FIG. 5 illustrates a diagram in accordance with a method 500 of the present invention. Method 500 starts in step 505 and proceeds to step 510. In step 510 a light source 115, 215, 315 is modulated with a light modulator 110, 210, 310. In step 515 a watermark is inserted onto an illuminated image sequence. A controller 125, 225, 325 controls the light modulator 110, 210, 310 such that the watermark is inserted onto the illuminated image sequence. The controller 125, 225, 325 may be programmed by a previous profiling stage. If a profiling stage is used, locations for insertion of watermarks into an illuminated image sequence are selected and stored. Controller 125, 225, 325 then implements the previously stored profile. Optionally, the controller 125, 225, 325 may maintain a sync signal, e.g., a content index, in order to maintain temporal and/or spatial registration. A signal may be received from the printer or projector in order to allow the controller 125, 225, 325 to register the current frame, thus maintaining temporal and/or spatial registration. Method 500 ends in step 520.

Serial and/or parallel embodiments may be implemented using straightforward optical assembly techniques. The fact that basic optical assembly techniques may be used allows the ability to retrofit existing projectors and printers, thus implementing the present invention at a potentially lower cost.

While the foregoing is directed to embodiments of the present invention, other and further embodiments of the invention may be devised without departing from the basic scope thereof, and the scope thereof is determined by the claims that follow.

The invention claimed is:

1. An apparatus for inserting a watermark onto an illuminated image sequence, comprising:

a light modulator configured for modulating a light source; and a controller configured for controlling the light modulator to selectively alter light transmissivity over space and time such that a low frequency watermark is inserted onto the illuminated image sequence.

2. The apparatus of claim 1, wherein the controller is configured to selectively alter light transmissivity over space and time based on a previous profiling stage.

3. The apparatus of claim 1, wherein the controller is configured to receive feedback from a projector or a printer in order to maintain temporal registration.

4. The apparatus of claim 1, wherein the controller is configured to receive feedback from a projector or a printer in order to maintain spatial registration.

5. The apparatus of claim 1, wherein the controller is configured to receive feedback from a projector or a printer in order to maintain spatio-temporal registration.

6. The apparatus of claim 1, wherein said light modulator is a slit modulator.

7. The apparatus of claim 1, wherein the low frequency watermark is inserted onto the illuminated image sequence using a serial configuration.

8. The apparatus of claim 7, wherein the low frequency watermark comprises a positive luminance excursion.

9. The apparatus of claim 7, wherein the low frequency watermark comprises a negative luminance excursion.

10. The apparatus of claim 7, wherein the low frequency watermark comprises positive luminance excursions and negative luminance excursions.

11. The apparatus of claim 7, wherein the light modulator is configured to cause appropriate levels of blur in the low frequency watermark.

12. The apparatus of claim 1, wherein the low frequency watermark is inserted onto the illuminated image sequence using a parallel configuration.

13. The apparatus of claim 12, wherein the low frequency watermark comprises a positive luminance excursion.

14. The apparatus of claim 1, wherein the low frequency watermark is inserted onto the illuminated image sequence using a serial configuration and a parallel configuration.

15. The apparatus of claim 14, wherein the low frequency watermark comprises negative luminance excursions and positive luminance excursions.

16. An apparatus for inserting a watermark, comprising:
a light source for illuminating an image sequence;
a lens for modifying the light from the light source;
a light modulator configured for modulating the modified light; and
a controller configured for controlling the light modulator to selectively alter light transmissivity over space and time such that a low frequency watermark is inserted onto the illuminated image sequence.

17. The apparatus of claim 16, further comprising:
an illuminated image sequence.

18. An apparatus for inserting a watermark, comprising:
a first light source configured for illuminating an image sequence;
a first lens configured for modifying the light from the first light source;
a first light modulator configured for modulating the modified light from the first light source;
a second light source;
a second lens configured for modifying the light from the second light source;
a second light modulator configured for modulating the modified light from the second light source; and a controller configured for controlling the first light modulator and the second light modulator to selectively alter light transmissivity over space and time such that a low frequency watermark is inserted onto the illuminated image sequence.

19. A method for inserting a watermark onto an illuminated image sequence, comprising:
modulating a light source with a light modulator; and
controlling the light modulator to selectively alter light transmissivity over space and time such that a low frequency watermark is inserted onto the illuminated image sequence.

20. The method of claim 19, further comprising selecting an appropriate modulation based on a previous profiling stage.

21. The method of claim 19, further comprising receiving feedback from a projector or printer in order to maintain temporal registration.

22. The method of claim 19, further comprising receiving feedback from a projector or printer in order to maintain spatial registration.

23. The method of claim 19, further comprising receiving feedback from a projector or printer in order to maintain spatio-temporal registration.

24. The method of claim 19, wherein said light modulator is a slit modulator.

25. The method of claim 19, further comprising inserting the low frequency watermark onto the illuminated image sequence using a serial configuration.

26. The method of claim 25, wherein the low frequency watermark comprises a positive luminance excursion.

27. The method of claim 25, wherein the low frequency watermark comprises a negative luminance excursion.

28. The method of claim 25, wherein the low frequency watermark comprises positive and negative luminance excursions.

29. The method of claim 19, wherein the light modulator is configured to cause appropriate levels of blur in the low frequency watermark.

30. The method of claim 19, further comprising inserting the low frequency watermark onto the illuminated image sequence using a parallel configuration.

31. The method of claim 19, wherein the low frequency watermark comprises a positive luminance excursion.

32. The method of claim 19, further comprising inserting the low frequency watermark onto the illuminated image sequence using a serial configuration and a parallel configuration.

33. The method of claim 32, wherein the low frequency watermark comprises negative luminance and positive luminance excursions.

34. The method of claim 19, further comprising: printing the illuminated image sequence.

35. The method of claim 19, wherein the low frequency watermark comprises temporally dynamic information.

36. The method of claim 19, further comprising:
projecting the illuminated image sequence.

37. The apparatus of claim 1 wherein the low frequency watermark is dependent on the time of projecting the illuminated image sequence.

38. The apparatus of claim 1 wherein the low frequency watermark is unique for each presentation of the illuminated image sequence.

39. An apparatus for inserting a watermark onto an illuminated image sequence, comprising:
means for modulating a light source; and means for controlling the means for modulating to selectively alter light transmissivity over space and time such that a low frequency watermark is inserted onto the illuminated image sequence.

40. The apparatus of claim 39, further comprising means for receiving feedback from a projector or printer in order to maintain spatio-temporal registration.

41. The apparatus of claim 39, wherein the means for modulation further comprise means for causing appropriate levels of blur in the low frequency watermark.

42. The apparatus of claim 39, further comprising means for printing the illuminated image sequence.

43. The apparatus of claim 39, further comprising: means for projecting the illuminated image sequence.

44. A method, comprising:
selecting one or more locations for watermark insertion;
modulating a light source using a light modulator; and
controlling the light modulator to selectively alter light transmissivity over space and time such that a low frequency watermark is inserted onto an image sequence at the one or more locations.

45. The method of claim 44, wherein selecting the one or more locations for watermark insertion comprises selecting the one or more locations based on a profile.

46. The method of claim 45, wherein selecting the one or more locations based on the profile comprises:
determining the one or more locations using a profiling stage; and
storing the determined one or more locations in the profile.

47. The method of claim 44, further comprising:
printing the illuminated image sequence.

48. The method of claim 44, further comprising:
projecting the illuminated image sequence.

49. A method, comprising:
modulating a light source using a light modulator; and
receiving a sync signal configured to register a frame of an image sequence;
controlling the light modulator to selectively alter light transmissivity over space and time such that a low frequency watermark is inserted onto the frame of the image sequence based on the sync signal.

50. The method of claim 49, wherein the sync signal is configured to maintain spatial registration of the frame of the image sequence.

51. The method of claim 49, wherein the sync signal is configured to maintain temporal registration of the frame of the image sequence.

52. The method of claim 49, wherein the sync signal is configured to maintain spatio-temporal registration of the frame of the image sequence.

53. The method of claim 49, further comprising:
displaying the illuminated image sequence.

* * * * *